(12) United States Patent
Estevez et al.

(10) Patent No.: US 11,218,942 B2
(45) Date of Patent: Jan. 4, 2022

(54) SIMPLE MESH NETWORK FOR WIRELESS TRANSCEIVERS

(71) Applicant: TEXAS INSTRUMENTS INCORPORATED, Dallas, TX (US)

(72) Inventors: Leonardo Estevez, Rowlett, TX (US); Avraham Baum, Giva't Shmuel (IS); Benzy Gabay, Palo Alto, CA (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 716 days.

(21) Appl. No.: 14/031,918

(22) Filed: Sep. 19, 2013

(65) Prior Publication Data

US 2015/0078198 A1   Mar. 19, 2015

(51) Int. Cl.
*H04W 40/00* (2009.01)
*H04W 84/12* (2009.01)
*H04W 84/18* (2009.01)

(52) U.S. Cl.
CPC ............ *H04W 40/00* (2013.01); *H04W 84/18* (2013.01)

(58) Field of Classification Search
None
See application file for complete search history.

(56) References Cited

U.S. PATENT DOCUMENTS

| | | | | |
|---|---|---|---|---|
| 2003/0031127 A1* | 2/2003 | Saleh | ................ | H04J 14/0227 370/228 |
| 2008/0192713 A1* | 8/2008 | Mighani | ............... | H04W 84/00 370/338 |
| 2008/0310342 A1* | 12/2008 | Kruys et al. | .................. | 370/328 |
| 2011/0158127 A1* | 6/2011 | Duo et al. | ...................... | 370/254 |
| 2011/0164527 A1* | 7/2011 | Mishra et al. | ................ | 370/252 |
| 2011/0255449 A1* | 10/2011 | Rappaport | ............ | H04B 1/719 370/277 |
| 2012/0100870 A1* | 4/2012 | Prost | ........................ | G01S 5/02 455/456.1 |
| 2012/0106528 A1 | 5/2012 | Estevez et al. | | |
| 2012/0127903 A1 | 5/2012 | Estevez et al. | | |
| 2013/0163412 A1* | 6/2013 | Hughes | ................. | H04W 40/04 370/228 |
| 2013/0250823 A1* | 9/2013 | Gaylard et al. | ............... | 370/310 |
| 2014/0071883 A1* | 3/2014 | Abraham | ................. | H04B 7/14 370/315 |

OTHER PUBLICATIONS

IEEE Computer Society, "Wireless LAN Medium Access Control (MAC) and Physical Layer Specification", IEEE 802.11 (Mar. 29, 2012).

* cited by examiner

*Primary Examiner* — Ruihua Zhang
(74) *Attorney, Agent, or Firm* — Ronald O. Neerings; Charles A. Brill; Frank D. Cimino

(57) ABSTRACT

A method of operating a mesh network is disclosed (FIG. 6). The method includes receiving a data frame (600) having a header with plural addresses (FIG. 1) and determining that the data frame is not from an access point or a leaf node (602) of the mesh network. A next recipient address of the plural addresses is removed (610) when the next recipient is a final destination. The next recipient address is set (612) when the next recipient of the data frame is not a final destination. The data frame is transmitted (614) to the next recipient.

9 Claims, 5 Drawing Sheets

| FRAME CONTROL | DURATION /ID | ADDRESS 1 | ADDRESS 2 | ADDRESS 3 | SEQUENCE CONTROL | ADDRESS 4 | QoS CONTROL | HT CONTROL | FRAME BODY | FCS |
|---|---|---|---|---|---|---|---|---|---|---|

MAC HEADER

FIG. 1
(PRIOR ART)

SIMPLE MESH NETWORK FOR WIRELESS TRANSCEIVERS

BACKGROUND OF THE INVENTION

The present embodiments relate to wireless mesh communication systems and, more particularly, to a communication protocol that is backwards compatible with existing IEEE 802.11 standards.

A wireless mesh network is a type of wireless communication where at least one wireless transceiver must not only receive and process its own data, but it must also serve as a relay for other wireless transceivers in the network. This may be accomplished by a wireless routing protocol where a data frame is propagated within the network by hopping from transceiver to transceiver to transmit the data frame from a source node to a destination node. A wireless node may be a wireless access point such as a wireless router, a mobile phone, or a computer capable of accessing the wireless local area network (WLAN). In other applications, the wireless node may be an external security monitor, a room monitor, a fire or smoke detector, a weather station, or any number of other WLAN applications for home or business environments.

A practical mesh network must maintain continuous network paths for all wireless nodes. This requires reliable network formation, reconfiguration around broken or interrupted network paths, and prioritized routing to ensure that data frames travel from source to destination along short yet reliable network paths.

FIG. 1 shows an exemplary medium access control (MAC) header of the prior art that may be appended to IEEE 802.11 data frames for wireless network communication. The first three fields (Frame Control, Duration/ID, and Address 1) and the last field (FCS) are present in all frames. The remaining fields are present only in certain frame types and subtypes of frames. The four address fields are used to indicate a basic service set identifier (BSSID), source address (SA), destination address (DA), transmitting station (STA) address (TA), and receiving STA address (RA).

FIG. 2 is a diagram showing a problem of limited range within an exemplary wireless mesh network. Access point (AP) 200 is directly connected to the internet and serves network nodes within area 202. These network nodes include non-legacy leaf node (NLN) 206, legacy leaf node (LLN) 208, and relay node (RN) 210. RN 210 has a range 204 that is smaller than area 202. However, area 204 extends beyond the coverage of area 202 of AP 200. Thus, RN 210 may relay data packets between LLN 212 and AP 200. Present proposals for IEEE 802.11-2012 provide for such a RN. Implementation, however, is difficult and is not compatible with legacy network nodes.

Although network proposals of the prior art provide steady improvements in wireless network communications, the present inventors recognize that still further improvements in mesh network protocol are possible. Accordingly, preferred embodiments described below are directed toward this and other improvements over the prior art.

BRIEF SUMMARY OF THE INVENTION

In a preferred embodiment of the present invention, there is disclosed a method of operating a mesh network in a wireless communication system. The method includes receiving a data frame having a header with plural addresses and determining that the data frame source is not an access point or a leaf node of the mesh network. A next address of the plural addresses is removed when a next recipient of the data frame is a final destination. The next address of the next recipient is set when the next recipient of the data frame is a final destination. The data frame is then transmitted to the next recipient.

BRIEF DESCRIPTION OF THE SEVERAL VIEWS OF THE DRAWING

FIG. 1 is a diagram of an IEEE 802.11 medium access control (MAC) header of the prior art;

DETAILED DESCRIPTION OF THE INVENTION

Figure 2:
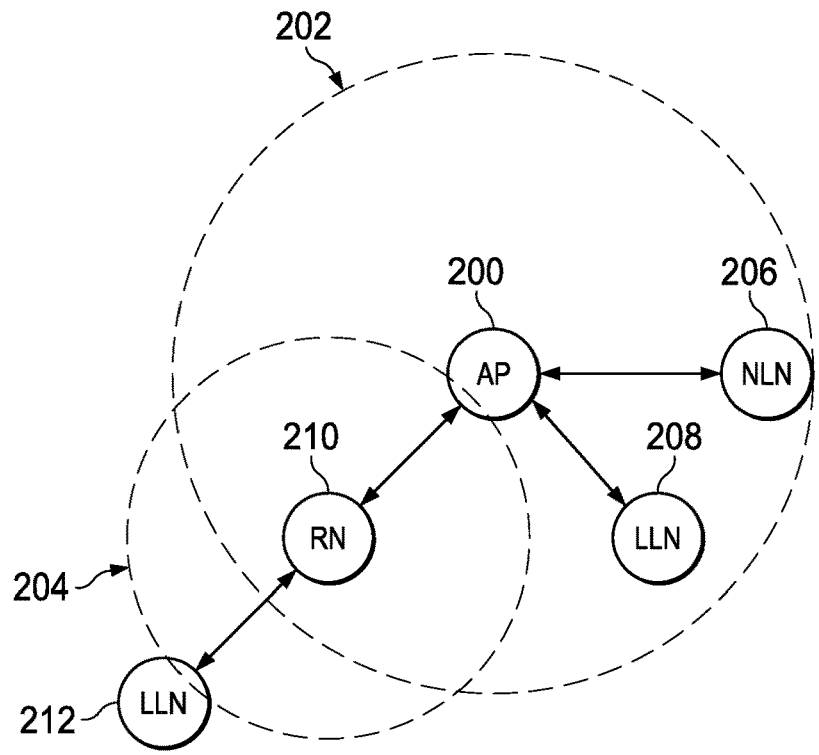
FIG. 2 is a diagram showing a problem of limited range within an exemplary wireless mesh network.
Figure 3:
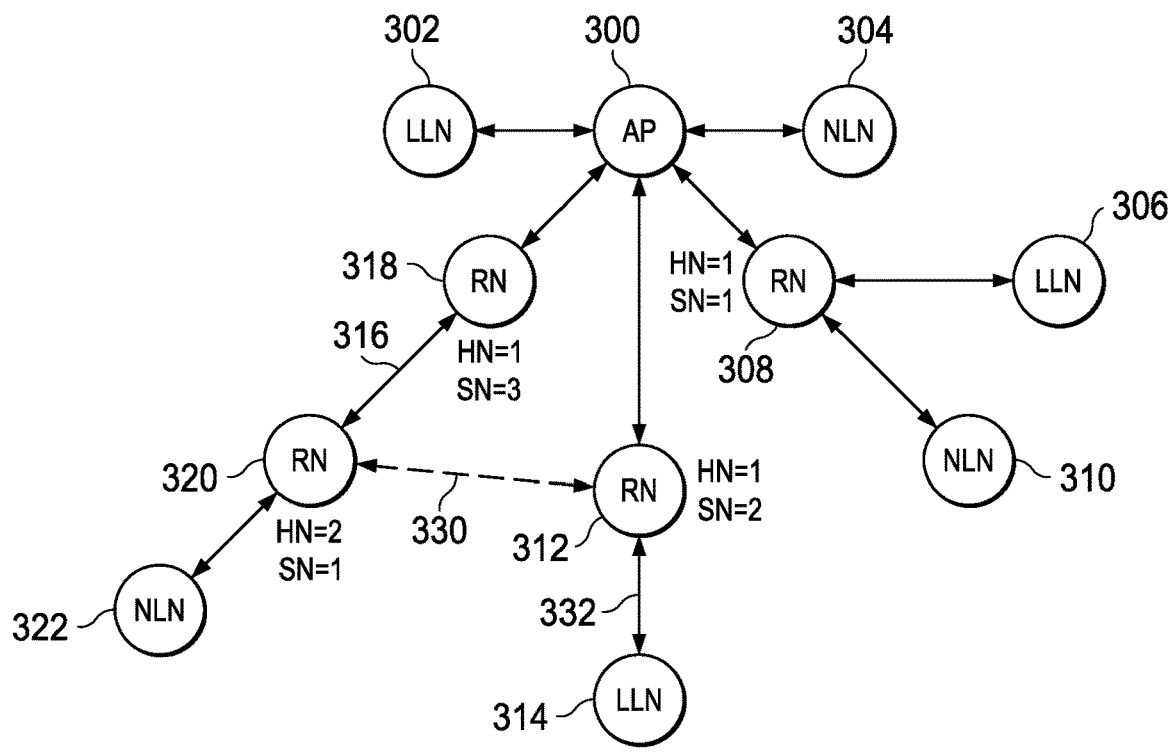
FIG. 3 is a diagram of a simple mesh wireless network of the present invention.

Referring now to FIG. 3, there is a diagram of a simple mesh wireless network of the present invention. The mesh network includes access point (AP) 300 which may be a wireless router having access to the internet by digital subscriber line (DSL), satellite, or other data source. AP 300 communicates directly with legacy leaf node (LLN) 302. Here, arrows are used to indicate wireless connection. AP 300 also communicates directly with non-legacy leaf node (NLN) 304. Finally, AP 300 directly communicates with relay nodes (RN) 308, 312, and 318. Relay nodes such as 308, 312, 318, and 320 may be mobile devices such as cell phones, tablets, laptop or desktop computers, other wireless routers, or other suitable wireless devices according to the present invention. Leaf nodes 306, 310, 314, and 322 either do not have sufficient signal strength to communicate directly with AP 300 or receive a substantially better signal from a corresponding RN as indicated by a received signal strength indicator (RSSI). For example, LLN 306 and NLN 310 communicate directly with RN 308. RN 308 relays data frames between AP 300 and leaf nodes 306 and 310. Likewise, LLN 314 communicates directly 322 with RN 312, and RN 312 relays data frames between AP 300 and LLN 314. As previously mentioned, RN 318 communicates directly with AP 300. However, RN 318 does not communicate directly with NLN 322. Rather, RN 318 directly communicates 316 with RN 320. RN 320 directly communicates with NLN 322. Thus, RN 318 relays data frames between RN 320 and AP 300 whether the data frames originate with RN 320 or NLN 322. Correspondingly, RN 320 relays data frames between RN 318 and NLN 322. The mesh network further includes redundant data paths such as data path 330 between RN 312 and RN 320. Therefore, if RN 318 drops out of the mesh network or signal quality is sufficiently degraded, data frames are relayed between RN 320 and AP 300 by RN 312.

Figure 4:
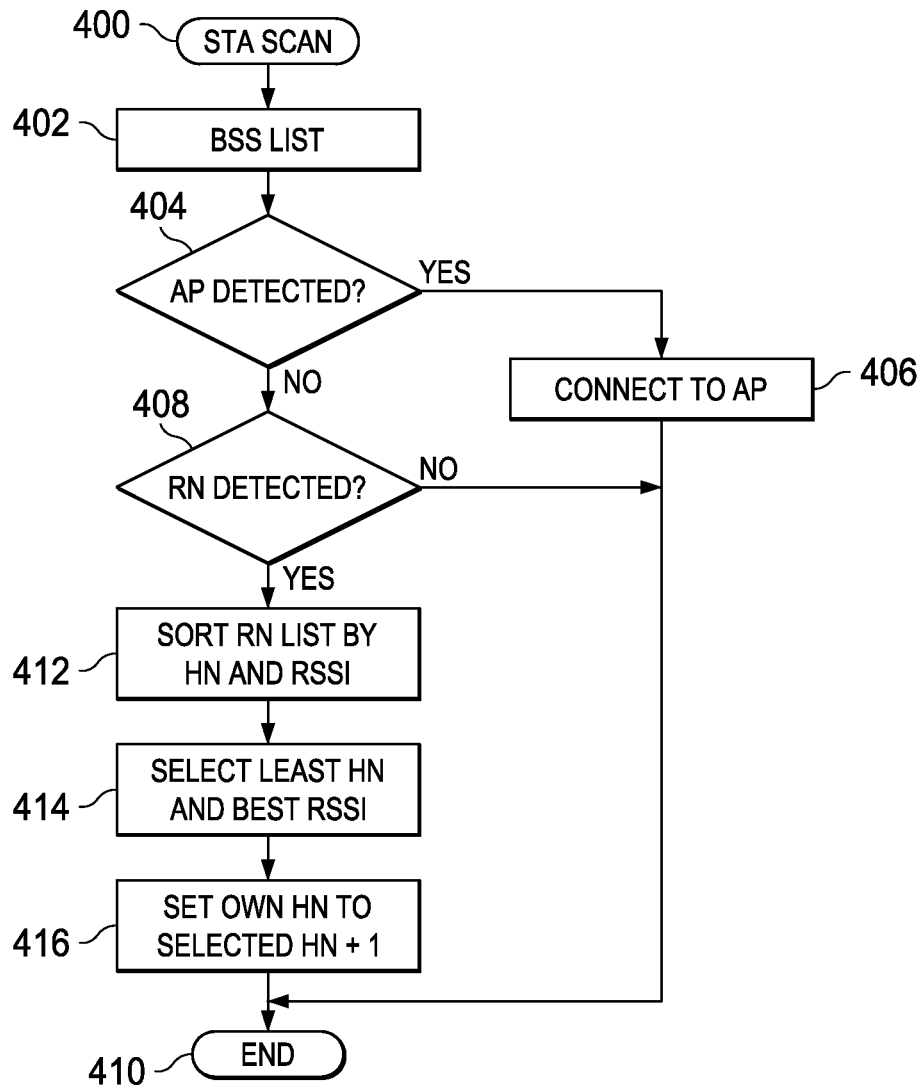
FIG. 4 is a flow diagram showing formation of the simple mesh network of FIG. 3.

Turning now to FIG. 4, there is a flow diagram showing formation of the simple mesh network of FIG. 3. The simple mesh network is preferably formed from the AP down to each leaf node (LN). The process begins when a wireless node wishing to join the mesh initiates a station scan 400. The wireless node then receives a basic service set (BSS) list 402 indicating all wireless nodes that are currently in the mesh network. If an AP is detected 404, the wireless node connects to the AP 406 and the process ends 410. This is the case when leaf nodes such as LLN 302 and NLN 304 join the mesh.

The process is slightly different when relay nodes such as RN 308, 312, and 318 join the mesh. Here, AP 300 is also detected at decision block 404. AP 300 has an implied hop number (HN) of 0. Each RN that directly connects to AP 300 adopts a HN of 1. The HN, therefore, indicates a logical distance from the AP. Moreover, RN 308 is the first RN to join the mesh and adopts a sibling number (SN) of 1. RN 312 is the second RN to join the mesh and adopts a SN of 2. RN 318 is the third RN to join the mesh and adopts a SN of 3.

At decision block 408, a wireless node wishing to join the mesh network determines if a RN is detected when no AP is detected. If no RN is detected, the wireless node is unable to join the mesh network and the process ends 410. Alternatively, if one or more RNs is detected, the wireless node sorts the RN list by HN and received signal strength indicator (RSSI) 412. For example, RN 320 detects RN 312 and RN 318. Both RN 312 and RN 318 have HN=1, but RN 318 has a greater RSSI. RN 320, therefore, selects 414 a primary connection 316 to RN 318 and a secondary or redundant connection 330 to RN 312. Moreover, according to the present invention each RN of the mesh may adopt several subordinate wireless nodes having a lower HN. RN 320 also sets 416 a HN=2, indicating it is one step further removed from AP 300 than either RN 312 or RN 318.

Legacy leaf nodes such as LLN 314 and 306 may simply connect to their respective RNs 312 and 308 as though they were directly connected to the AP. In this case, the respective RN simply relays upstream and downstream data frames between the LLN and the AP as will be explained in detail. In effect, the LLN thinks it is directly connected to the AP. Non-legacy leaf nodes (NLN) such as 310 and 322 connect to respective RNs 308 and 320 in a similar manner. However, NLN 310 also adopts HN=2 and SN=2 and may serve as a RN if another downstream LN should join the mesh. Likewise, NLN 322 adopts HN=3 and SN=1 and may serve as a RN if another downstream LN should join the mesh.

Figure 5:
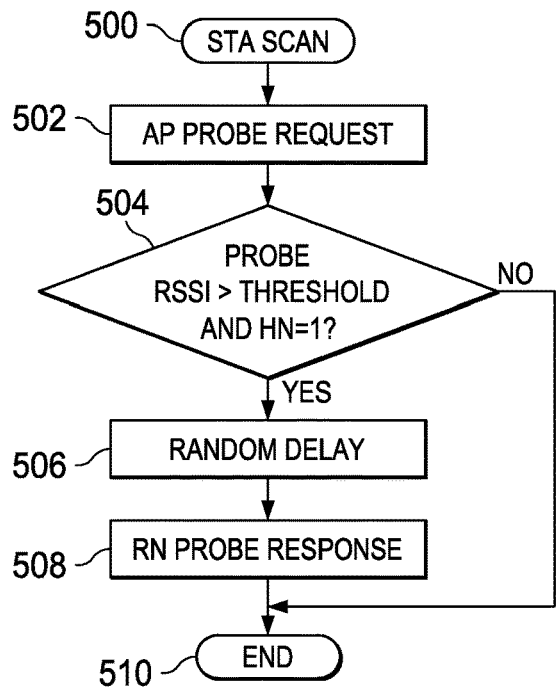
FIG. 5 is a flow diagram showing mesh discovery when a new wireless node enters the wireless network of FIG. 3.

Referring next to FIG. 5, there is a flow diagram showing mesh discovery when a new wireless node enters the wireless network of FIG. 3. A wireless node wishing to enter an existing mesh will initiate a station scan 500. As previously discussed with regard to FIG. 4, if an AP is detected 404 the wireless node will simply connect to the AP 406 and the process ends 410. Alternatively, the wireless node sends an AP probe request 502. Each RN in the mesh that receives the probe request will measure the RSSI of the probe. An RN that measures an RSSI above an acceptable threshold and has a HN=1 will wait a respective random delay period 506 and send a probe response 508 that is identical to an AP probe response. The random delay assures that the subsequent RN probe response 508 will not collide with a delayed AP response. If the wireless node is a NLN, it may select the RN with the lowest HN. Alternatively, if the wireless node is a LLN, it sends back an information element. The best RN then registers the NLN or LLN and announces the registration throughout the mesh to avoid multiple registration.

Figure 6:
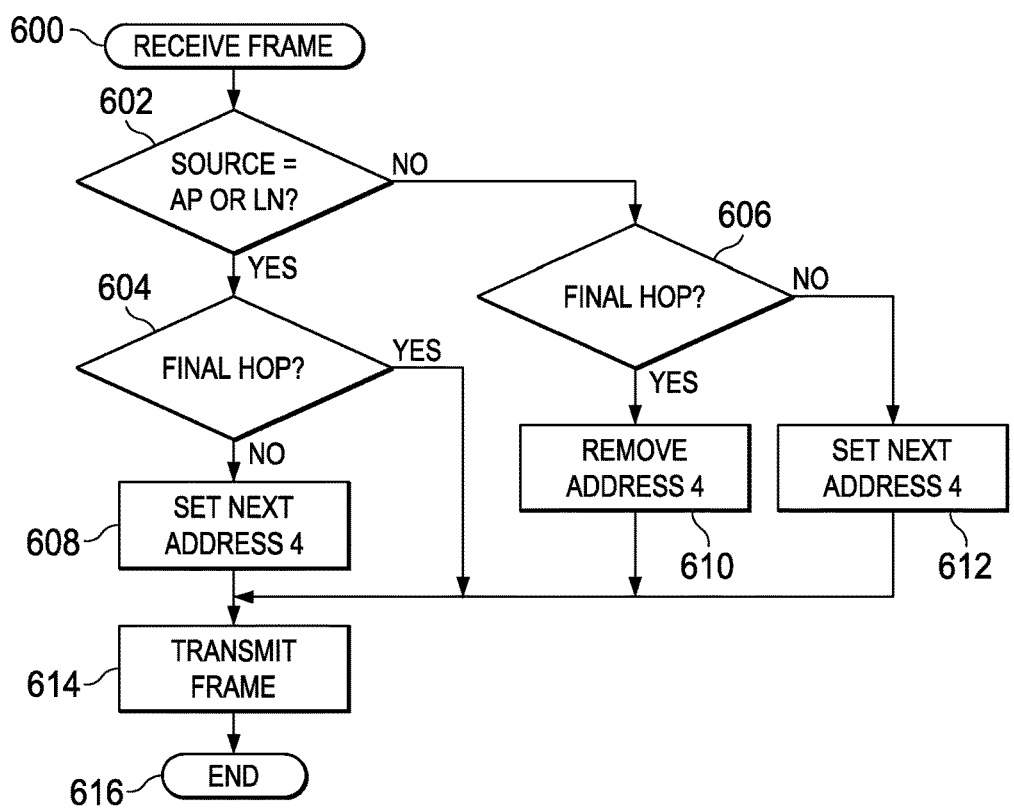
FIG. 6 is a flow diagram showing data frame distribution through a relay node (RN) within the wireless network of FIG. 3.

Referring now to FIG. 6, there is a flow diagram showing data frame distribution through a relay node (RN) within the wireless network of FIG. 3. For the simple case where a LLN 302 or NLN 304 is directly connected to AP 300, data frame distribution proceeds according to IEEE 802.11. An RN, however, first determines from the MAC header (FIG. 1) whether the data frame is directly from the AP or a LN 602. If decision block 602 is true, the RN then determines if this relay will be the final hop 604. For example, if RN 308 receives a data frame from AP 300 the relay to NLN 310 will be the final hop. Correspondingly, if RN 308 receives a data frame from NLN 310 the relay to AP 300 will also be the final hop. If the relay transmission is the final hop, RN 308 transmits the data frame to the destination address (DA) with no change to the MAC header. If decision block 604 determines that the relay transmission is not the final hop, the RN sets next address 4 of the MAC header to point to the next RN 608. For example, if RN 318 receives a data frame from AP 300 the relay to RN 320 will not be the final hop. RN 318, therefore, sets address 4 of the MAC header to point to RN 320 and transmits the data frame 614. Correspondingly, if RN 320 receives a data frame from NLN 322 the relay to RN 318 will not be the final hop. Thus, RN 320 sets address 4 of the MAC header to point to RN 318 and transmits the data frame 614. In either case, only the RN specified by address 4 of the MAC header will service the received data frame.

If decision block 602 determines that a received data frame is not from an AP or LN, then it must be from another RN. Decision block 606 then determines if the relay transmission will be the final hop. For example, if RN 318 receives a data frame from RN 320, the relay transmission from RN 318 to AP 300 will be the final hop. In this case, address 4 of the MAC header is removed 610 and the data frame is relayed to AP 300 in a standard three address format according to IEEE 802.11. Likewise, if RN 320 receives a data frame from RN 318, the relay transmission from RN 320 to NLN 322 will be the final hop. In this case, address 4 of the MAC header is also removed 610 and the data frame is relayed to NLN 322 in the standard three address format according to IEEE 802.11. However, when decision block 606 determines that the relay transmission is not the final hop it means there is at least another RN in the mesh between the current RN and the destination wireless node at address DA of the MAC header. In this case, the RN sets next address 4 of the MAC header to point to the next RN 612 and transmits the data frame 614. This process is repeated as necessary until a final hop to address DA is detected. After the final transmission to address DA of the MAC header, the process ends 616.

The simple mesh data frame distribution method of the present invention offers several advantages over methods of the prior art. First, it is compatible with existing IEEE 802.11 networks. A RN of the present invention will appear as a LN to the AP and will appear as an AP to each LLN or NLN it serves. Second, the RN may be any IEEE 802.11 wireless device capable of adding a next address to address field 4 of the MAC header for transmission to a next RN and removing the next address from address field 4 of the MAC header for a final hop transmission to an AP or LN. Third, each RN comprehends redundant data paths which may be used when a wireless node drops out of the data path, thereby making the mesh network less likely to drop data frames. Fourth, the mesh network of the present invention requires no additional components and adds no additional cost to the mesh network. Finally, the mesh network of the present invention extends the coverage area of a single AP over complex structures such as office buildings, apartment complexes, hotels and motels, and other multi-story structures without the need for additional APs.

Figure 7:
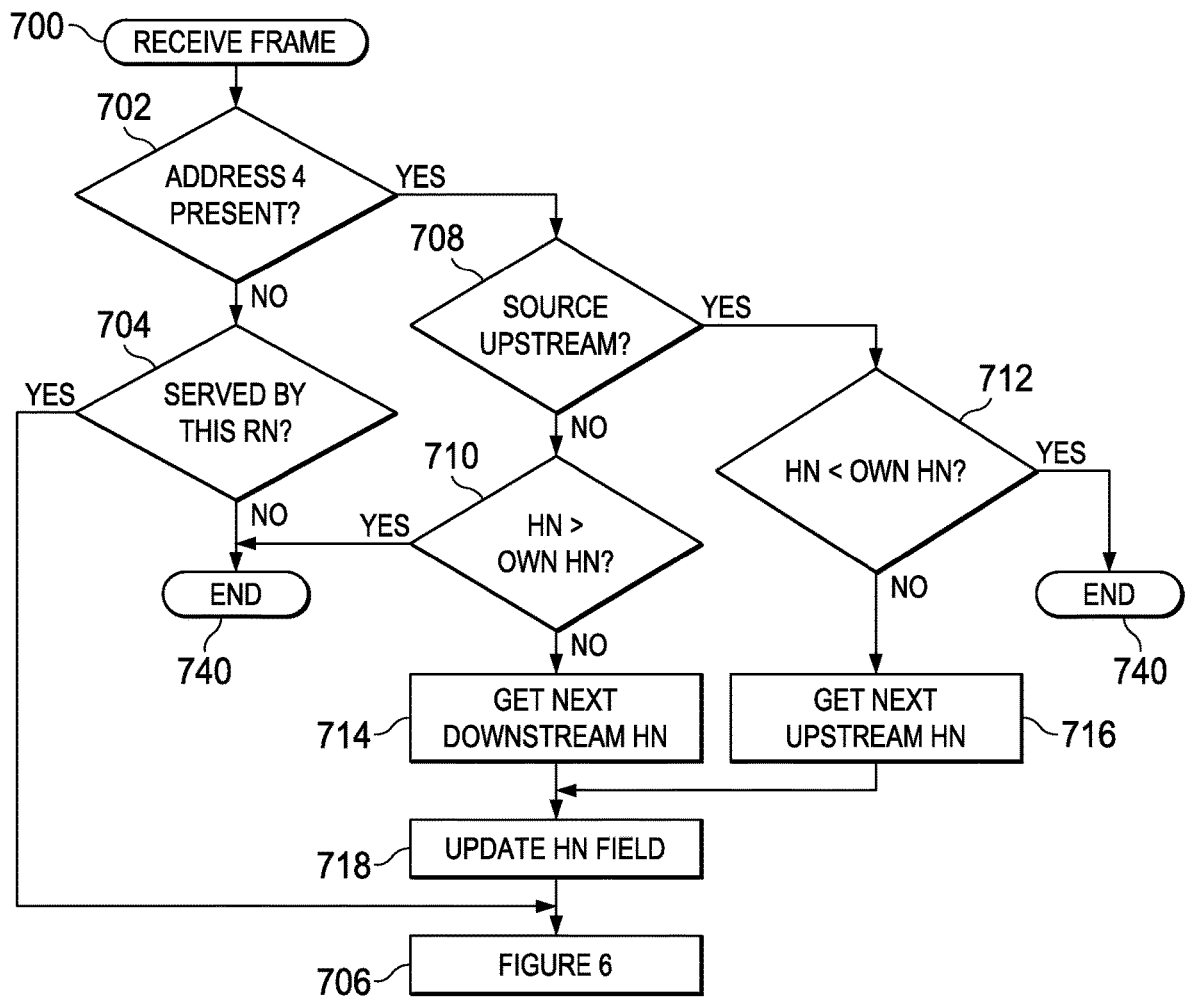
FIG. 7 is a flow diagram showing circular routing detection within a wireless mesh network.

Turning now to FIG. 7, there a flow diagram showing circular routing detection within a wireless mesh network.

Formation of a simple mesh network of the present invention preferably precludes circular data frame transmission. This is because RNs in the data path from the AP to any LN preferably have increasing HNs. Thus, downstream transmissions proceed from lower to higher HNs, and upstream transmissions proceed from higher to lower HNs. However, redundant data paths such as 330 (FIG. 3), the condition that each RN may serve multiple RNs and LNs, and the dynamic nature of the mesh network may produce a circular routing path. If undetected, a circular routing path may result in repeated data frame transmission between two or more RNs so that the data frame never reaches the intended destination. The method of FIG. 7 detects and corrects undesirable circular routing paths. A data frame first received 700, and the receiving RN determines if address 4 of the MAC header is present 702. If address 4 is not present, the source is either the AP or one of the LNs. At decision block 704 the receiving RN determines whether the source address (SA) LN is served by this RN. If not, the process ends 740, and the RN effectively decides the data frame is intended for another RN. If the data frame is from an LN served by the receiving RN, data frame transmission continues 706 as previously described with regard to FIG. 6.

If decision block 702 determines that address 4 of the MAC header is present, decision block 708 then determines if the source of the data frame is upstream. If the source is downstream, decision block 710 determines whether the HN of the transmitting RN is greater than the HN of the receiving RN. If so, the process ends 740. If not, a circular routing path is detected since a downstream RN should have a greater HN than an upstream RN. The receiving RN then gets the next downstream HN 714, which is preferably one greater than its own HN and updates the transmitting RN's HN field 718. Data frame transmission then continues 706 as previously described with regard to FIG. 6.

If decision block 708 determines the source is upstream, decision block 712 determines whether the HN of the transmitting RN is less than the HN of the receiving RN. If so, the process ends 740. If not, a circular routing path is detected since an upstream RN should have a smaller HN than a downstream RN. The receiving RN then gets the next upstream HN 716, which is preferably one less than its own HN and updates the transmitting RN's HN field 718. Data frame transmission then continues 706 as previously described with regard to FIG. 6.

Still further, while numerous examples have thus been provided, one skilled in the art should recognize that various modifications, substitutions, or alterations may be made to the described embodiments while still falling with the inventive scope as defined by the following claims. Other combinations will be readily apparent to one of ordinary skill in the art having access to the instant specification.

What is claimed is:

1. A method of operating a mesh network, comprising steps of:
   receiving a basic service set list by a first wireless node indicating all wireless nodes in the mesh network;
   receiving by the first wireless node a data frame having a header with a frame control field, a duration/ID field, no more than four address fields, and a last field (FCS);
   determining by the first wireless node if the data frame source is one of an access point (AP) and a leaf node (LN) of the mesh network;
   in response to determining that the data frame source is one of an access point (AP) and a leaf node (LN), determining if the next recipient of the mesh network is a final destination;
   in response to determining that the next recipient of the mesh network is not a final destination, setting a next address in a fourth of the no more than four address fields to point to a next recipient;
   in response to determining that the data frame source is not one of an access point (AP) and a leaf node (LN) of the mesh network, determining if the next recipient of the mesh network is a final destination;
   in response to determining that the next recipient of the mesh network is not a final destination, setting a next address of the no more than four address fields to point to a next recipient;
   in response to determining that the data frame source is not one of an access point (AP) and a leaf node (LN), determining whether the data frame source node is upstream or downstream from a receiving node;
   comparing a hop number of the source node to a hop number of the receiving node, wherein each hop number indicates a number of hops of a respective node from the AP;
   if the source node is downstream from the receiving node and the hop number of the source node is less than or equal to the hop number of the receiving node, incrementing the hop number of the receiving node;
   if the source node is upstream from the receiving node and the hop number of the source node is greater than or equal to the hop number of the receiving node, decrementing the hop number of the receiving node; and
   transmitting the data frame to the next recipient.

2. A method of operating a mesh network, comprising steps of:
   receiving a basic service set list by a first wireless node indicating all wireless nodes in the mesh network;
   receiving by the first wireless node a data frame having a header with a frame control field, a duration/ID field, no more than four address fields, and a last field (FCS);
   determining by the first wireless node if the data frame source is one of an access paint (AP) and a leaf node (LN) of the mesh network;
   in response to determining that the data frame source is not one of an access point (AP) and a leaf mode (LN), determining if next recipient of the data frame is a final destination;
   in response to determining that the next recipient of the data frame is not a final destination, setting a next address in a fourth of the no more than four address fields to point to the next recipient;
   in response to determining that the data frame source is not one of an access point (AP) and a leaf node (LN), determining whether the data frame source node is upstream or downstream from a receiving node;
   comparing a hop number of the source node to a hop number of the receiving node, wherein each hop number indicates a number of hops of a respective node from the AP;
   if the source node is downstream from the receiving node and the hop number of the source node is less than or equal to the hop number of the receiving node, incrementing the hop number of the receiving node;
   if the source node is upstream from the receiving node and the hop number of the source node is greater than or equal to the hop number of the receiving node, decrementing the hop number of the receiving node; and
   transmitting the data frame to the next recipient.

3. A method of operating a wireless node of a mesh network, comprising the steps of a) receiving a data frame having a header with plural addresses;
b) determining if the data frame was received from a relay node of the mesh network;
c) in response to determining that the data frame was received from a relay node, determining whether the relay node is upstream or downstream from the wireless node;
d) comparing a hop number of the relay node to a hop number of the wireless node;
e) if the relay node is downstream from the wireless node and the hop number of the relay node is less than or equal to the hop number of the wireless node, incrementing the hop number of the wireless node; and
f) if the relay node is upstream from the wireless node and the hop number of the relay node is greater than or equal to the hop number of the wireless node, decrementing the hop number of the relay node, wherein each hop number indicates a number of hops of a respective node from an access paint (AP).

4. A method ag in claim 3, further comprising the step of:
g) determining if the data frame was received from a source served by the wireless node; and
h) ignoring the data frame if the source is not served by the wireless node.

5. A method as in claim 4, comprising the steps of
i) determining if the data fame source is the AP or a leaf node (LN) of the mesh network;
j) in response to determining that the data frame source is the AP or a leaf node (LN) of the mesh network, determining if next recipient of the mesh network is a final destination;

k) in response to determining that the next recipient of the mesh network is not a final destination, setting a next address of the plural addresses to point to a next recipient;
l) in response to determining that the data frame source is not one of an access point (AP) and a leaf node (LN) of the mesh network, determining if the next recipient of the data frame is a final destination;
m) in response to determining that the next recipient of the data frame is not a final destination, setting a next address of the plural addresses to point to a next recipient;
n) in response to determining that the next recipient of the data frame is a final destination, removing a next address of a next recipient from the plural addresses; and
o) transmitting the data frame to the next recipient.

6. A method as in claim 3, wherein the mesh network is a simple mesh network.

7. A method as in claim 3, wherein the mesh network is a single tier mesh network.

8. A method as in claim 3, wherein each network node serves as a relay node receiving a basic service set list (BBS).

9. A method as in claim 3, wherein each network node receives and transmits not more than four address fields within each step of network operations.

* * * * *